R. R. NEAL.
AUTOMOBILE SPRING.
APPLICATION FILED MAY 11, 1916.
1,209,322.
Patented Dec. 19, 1916.
Fig.1.
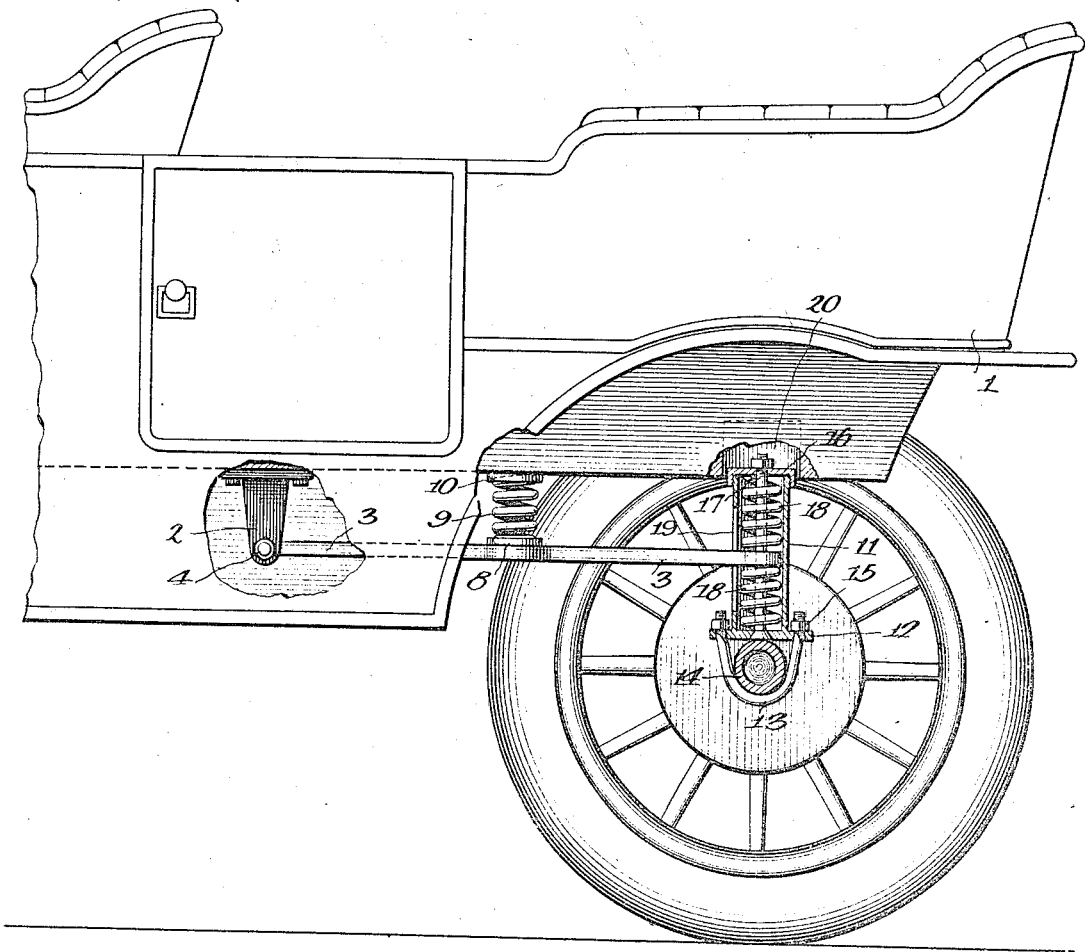
Fig. 4.
Fig. 2.
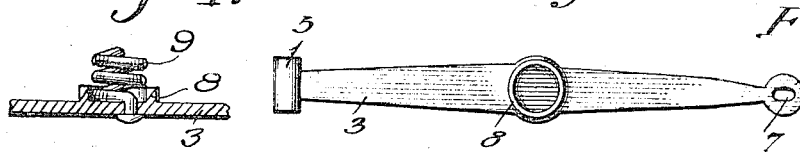
Fig. 3.
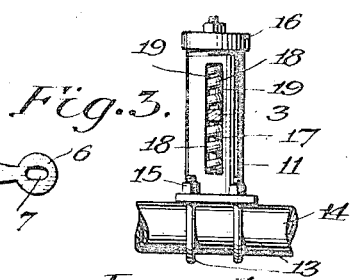
Witnesses:
Inventor:
Robert R. Neal.
by
his Attorneys

UNITED STATES PATENT OFFICE.

ROBERT R. NEAL, OF WILBUR, WASHINGTON.

AUTOMOBILE-SPRING.

1,209,322.  Specification of Letters Patent.  Patented Dec. 19, 1916.

Application filed May 11, 1916. Serial No. 96,913.

*To all whom it may concern:*

Be it known that I, ROBERT R. NEAL, a citizen of the United States of America, residing at Wilbur, in the county of Lincoln and State of Washington, have invented certain new and useful Improvements in Automobile-Springs, of which the following is a specification, reference being had therein to the accompanying drawing.

This invention relates to automobile springs and has for its object the production of a simple and efficient spring which will yieldably support the body so as to eliminate a shock upon the body as much as possible while the machine is traveling over a rough road.

Another object of this invention is the production of a simple and efficient spring mechanism for supporting the body of an automobile or other vehicle, which spring mechanism may be very cheaply constructed and consists of a minimum number of parts.

With these and other objects in view this invention consists of certain novel combinations, constructions, and arrangements of parts as will be hereinafter fully described and claimed.

In the accompanying drawing: Figure 1 is a side elevation of the rear end of an automobile showing the spring mechanism applied thereto. Fig. 2 is a top plan view of the spring engaging lever. Fig. 3 is a front elevation of the spring retaining casing, showing the spring engaging lever in section. Fig. 4 is a longitudinal section of the spring engaging lever showing the manner of holding the intermediate spring in engagement therewith.

By referring to the drawing it will be seen that 1 designates the body of the automobile which is provided with a hanger 2 secured to the bottom of the body, and a spring engaging lever 3 is pivotally connected to the hanger 2 by means of a pivot pin 4 passing through the journal portion 5 of the lever 3. This lever 3 is provided with a spring engaging end 6, which spring engaging end 6 is provided with an elliptical opening 7 as illustrated in Fig. 2 of the drawing. The lever 3 is provided intermediate its end with a spring receiving cup 8, which spring receiving cup 8 is adapted to constitute a seat for the intermediate spring 9 as illustrated in Fig. 1 of the drawing. This spring 9 has its lower end seated and secured in a spring receiving cup 8. A spring receiving cup 10 is secured to the bottom of the body 1 of the vehicle and is adapted to have the upper end of the spring 9 seated therein.

The rear end of the lever 3 works in a spring housing or casing 11, which spring housing or casing 11 is of a tubular formation and is provided with an enlarged flange bottom 12 as illustrated in Fig. 1. A yoke bolt 13 passes around the axle 14 of the automobile, and nuts 15 are threaded upon the ends of the yoke bolt 13 for firmly clamping the casing 11 in engagement with the axle 14. The upper end of the casing 11 is provided with a threaded cap 16 constituting a closure for the upper end of the casing 11, and a rod 17 passes through this cap 16, and has its lower end secured in the bottom of the casing 11 as illustrated in Fig. 1. This rod 17 passes through the elliptical aperture 7 formed in the lever 3 so as to permit the free sliding movement of the lever 3 up and down within the casing 11. A spring 18 is carried in each end of the casing 11 and constitutes a yieldable support for the lever 3 for holding the lever 3 in a position substantially central between the top and bottom of the casing 11. This lever 3 passes through a vertical longitudinally extending slot 19 formed in the casing 11, thereby permitting the free up and down movement of the lever 3 within the casing 11. The body 1 is provided with a socket 20 for permitting the casing 11 to have a free vertical movement without being obstructed by the body 1. It should be understood that the construction of the slot 19 will prevent the lever 3 from being pulled forwardly owing to the fact that the enlarged head 6 at the rear end of the lever 3 will resist any forward movement thereby preventing the bending of the rod 17. It should also be understood that the elliptical aperture 7 will permit the free movement of the lever 3 without binding upon the rod 17.

It should be understood that the spring mechanism illustrated and described may be employed upon all four corners of the machine and in any desired position without departing from the spirit of the invention, and in view of the fact that all of the devices will be similarly constructed, it is thought necessary to only illustrate in detail one of these devices.

Having thus described the invention what is claimed as new, is:—

1. A spring for a vehicle comprising a spring supporting lever, a hanger bracket adapted to be secured to the body of a vehicle, means for pivotally connecting said lever to said hanger bracket, said lever provided with a spring engaging cup intermediate the ends thereof, a compression spring seated within said cup, a second cup adapted to be carried by the bottom of the body of a vehicle for receiving the opposite end of said spring, and a spring engaging the outer end of said lever for constituting a yieldable support therefor and yieldably connecting said lever with said axle.

2. A spring for a vehicle comprising a spring supporting lever, resilient buffer means engaging said lever near the center thereof, means for pivotally supporting one end of said lever, a spring supporting casing, a lever, said lever working in said spring supporting casing, a rod passing longitudinally of said spring supporting casing and passing through the rear end of said lever, and a spring placed above and below said lever within said casing for yieldably holding said lever intermediate the ends of said casing and yieldably connecting said lever with said axle.

3. A spring for a vehicle comprising a spring supporting lever, means for pivotally securing said lever in engagement with a support, a spring engaging said lever intermediate the ends thereof, a spring supporting casing, said casing provided with a longitudinally extending slot, said lever passing through said slot and provided with an enlarged head, a rod passing longitudinally of said casing and extending through said enlarged head, a spring engaging the top and bottom of said head for yieldably holding said head intermediate the ends of said casing, and means for securing said casing to the axle of a vehicle.

In testimony whereof I hereunto affix my signature.

ROBERT R. NEAL.